(12) United States Patent
Georges

(10) Patent No.: US 11,970,285 B2
(45) Date of Patent: Apr. 30, 2024

(54) ON-BOARD EMERGENCY REMOTE ASSISTANCE AND DATA RETRIEVABLE SYSTEM FOR AN AERIAL VEHICLE

(71) Applicant: Jean Edrice Georges, Boynton Beach, FL (US)

(72) Inventor: Jean Edrice Georges, Boynton Beach, FL (US)

( * ) Notice: Subject to any disclaimer, the term of this patent is extended or adjusted under 35 U.S.C. 154(b) by 283 days.

(21) Appl. No.: 17/207,662

(22) Filed: Mar. 20, 2021

(65) Prior Publication Data
US 2021/0229830 A1 Jul. 29, 2021

Related U.S. Application Data

(63) Continuation-in-part of application No. 15/829,872, filed on Dec. 1, 2017, now Pat. No. 10,988,251.

(51) Int. Cl.
| | |
|---|---|
| *B65D 45/00* | (2006.01) |
| *B64C 39/02* | (2023.01) |
| *B64D 45/00* | (2006.01) |
| *G05D 1/00* | (2006.01) |
| *G05D 1/10* | (2006.01) |
| *G08G 5/00* | (2006.01) |

(52) U.S. Cl.
CPC .......... *B64D 45/00* (2013.01); *B64C 39/024* (2013.01); *G05D 1/0022* (2013.01); *G05D 1/101* (2013.01); *G08G 5/0021* (2013.01); *B64D 2045/0065* (2013.01); *B64U 2201/20* (2023.01)

(58) Field of Classification Search
CPC . B64C 39/024; B64C 2201/127; B64D 45/00; B64D 47/06; B64D 47/08; B64D 2045/0065; G05D 1/0022; G05D 1/101; G08G 5/0021; B64U 2201/20
USPC ............................................................ 244/2
See application file for complete search history.

(56) References Cited

U.S. PATENT DOCUMENTS

| | | | |
|---|---|---|---|
| 8,950,698 B1 * | 2/2015 | Rossi ..................... | B64C 27/26 244/63 |
| 9,056,676 B1 * | 6/2015 | Wang ...................... | B64F 1/222 |
| 9,313,667 B1 * | 4/2016 | Daoura ................. | G05D 1/0011 |
| 9,723,468 B2 * | 8/2017 | Cho ....................... | H04B 17/318 |
| 10,796,509 B2 * | 10/2020 | Satyanarayana ..... | G07C 5/0858 |
| 10,988,251 B2 * | 4/2021 | Georges ................. | B64D 47/06 |
| 11,567,508 B2 * | 1/2023 | Larson ................. | H04N 13/243 |

(Continued)

FOREIGN PATENT DOCUMENTS

| | | | |
|---|---|---|---|
| WO | WO-2016203322 A2 * | 12/2016 | ........... B64C 39/024 |
| WO | WO-2017142520 A1 * | 8/2017 | |
| WO | WO-2018209375 A1 * | 11/2018 | ........... B60R 25/305 |

*Primary Examiner* — Joshua E Rodden

(57) ABSTRACT

The present invention relates to an on-board emergency remote assistance and data retrievable system configured to download and retrieve image, audio and video information from the inside and outside of a manned aerial vehicle (MAV) using an on-board unmanned aerial vehicle (UAV), while the MAV is either in the air or crashed. The UAV system including at least one drone in coordination with a remote station to automatically locate a distressed MAV while in operation, to track it and provide assistance when possible, wherein the drone being integrated into the MAV. The system of the present invention conclusively prevents the lost or disappearance, and crash of the manned aerial vehicle without a trace.

8 Claims, 8 Drawing Sheets

(56) References Cited

U.S. PATENT DOCUMENTS

| | | | | |
|---|---|---|---|---|
| 2009/0314883 | A1* | 12/2009 | Arlton | F41A 9/13 |
| | | | | 244/63 |
| 2013/0233964 | A1* | 9/2013 | Woodworth | B64C 27/20 |
| | | | | 244/175 |
| 2014/0197280 | A1* | 7/2014 | Smith | B64C 3/10 |
| | | | | 244/35 R |
| 2015/0102154 | A1* | 4/2015 | Duncan | B64C 39/022 |
| | | | | 701/300 |
| 2016/0214717 | A1* | 7/2016 | De Silva | H04L 67/12 |
| 2016/0240020 | A1* | 8/2016 | Tang | B64C 39/024 |
| 2016/0260264 | A1* | 9/2016 | Shih | G08G 5/0021 |
| 2017/0092109 | A1* | 3/2017 | Trundle | B60L 53/305 |
| 2018/0029522 | A1* | 2/2018 | Gordon | B60Q 1/52 |
| 2018/0232969 | A1* | 8/2018 | Florence | B63B 79/30 |
| 2018/0233038 | A1* | 8/2018 | Kozloski | G08G 1/04 |
| 2019/0061663 | A1* | 2/2019 | Benmimoun | B64C 39/024 |
| 2019/0315462 | A1* | 10/2019 | Skladman | B64C 39/022 |
| 2021/0398434 | A1* | 12/2021 | Madden | H04L 67/12 |

* cited by examiner

10 X 3

30 X 3

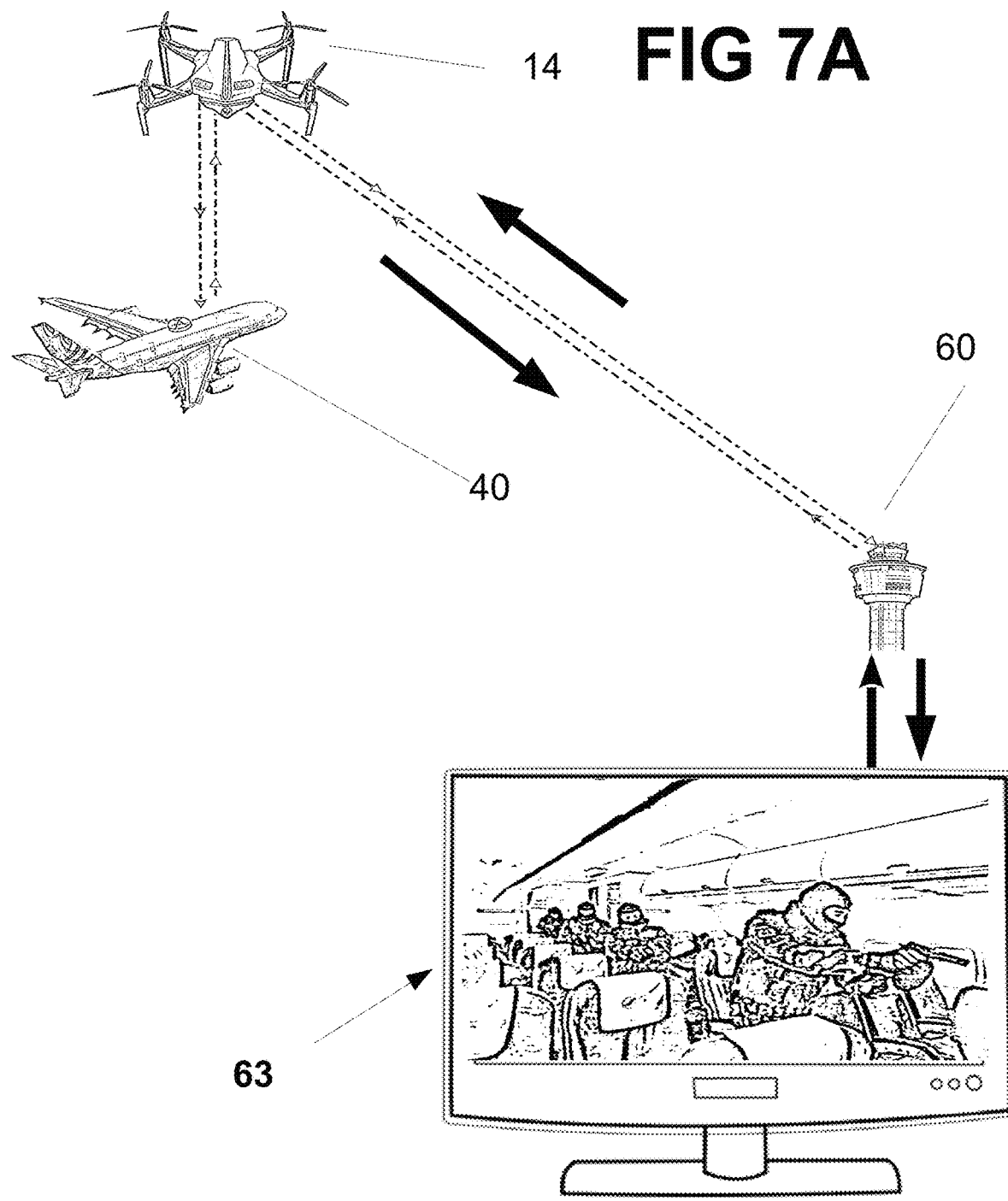

ON-BOARD EMERGENCY REMOTE ASSISTANCE AND DATA RETRIEVABLE SYSTEM FOR AN AERIAL VEHICLE

CROSS-REFERENCE TO RELATED APPLICATIONS

This application is a continuation-in-part of a previous U.S. patent application Ser. No. 15/829,872 filed by the same inventor on Dec. 1, 2017, which claims priority under 35 USC Section 119(e) to U.S. Provisional Patent Application Ser. No. 62/429,790 filed on Dec. 3, 2016, all of which are incorporated herein by reference in their entireties.

FIELD OF THE INVENTION

The present invention relates to an on-board emergency system for a vehicle, and more particularly it relates to an on-board emergency remote assistance and data retrievable system that downloads and retrieves image, audio and video information of the MAV using an on-board unmanned aerial vehicle (UAV) while the MAV is either in the air or crashed.

BACKGROUND OF THE INVENTION

Distressing conditions on-board any type of vehicle, particularly a passenger vehicle, such as a manned aerial vehicle, ship, boat, train, bus, vehicle trailer, or the like, can create confusion and chaos when it occurs. Take the case of an air vehicle like an aircraft, for example, where the pilot may have a few minutes to evaluate and remedy a rapidly degenerating situation onboard. In most cases, power and communication may even fail before the pilot can describe the problem in full details to the air traffic control. Then all a sudden, the aircraft disappears from the radar, leaving everybody on the ground guessing. The next thing you know is that the plane is reported missing, and most of them have never been found.

For instance, take the case of Kobe Bryant, the famous basketball star who died during a helicopter crash. The pilot who crashed the helicopter carrying Kobe Bryant, killing all nine aboard, made a series of poor decisions that led him to fly blindly into a wall of clouds where he became so disoriented that he thought he was climbing when the craft was plunging toward a Southern California hillside, as per reported by federal safety officials. The National Transportation Safety Board primarily blamed pilot Ara Zobayan in the Jan. 26, 2020 crash that killed him along with Bryant, the basketball star's daughter and six other passengers heading to a girls' basketball tournament.

As a flight instructor described it "If you're flying visually, if you get caught in a situation where you can't see out the windshield, the life expectancy of the pilot and the aircraft is maybe 10, 15 seconds, and it happens all the time, and it's really a shame". Yes, indeed.

According to expect, the same thing happened to John F. Kennedy Jr. when his plane dropped out of the sky near Martha's Vineyard, Massachusetts, in 1999. These tragedies aren't the first, and by no mean won't be the last.

However, if the present technology or invention (filed December, 2017) was available at the time of Kobe Bryant's accident (January, 2020), the pilot could have deployed such a tool with no hesitation, the moment he felt being disoriented or even prior considering climbing above the cloud, a well-known risky operation in the field according to aviation experts. On the other hand, as in the case of Artificial Intelligence (AI) or machine learning, the UAV could even go further by detecting the flying environment of the helicopter from the start while suggesting the auto pilot system, an option that might not come to pilot's mind since he was operating under pressure. In this situation, the Unmanned Aerial Vehicle (UAV) could also be self-deployed if the pilot failed to do so while approaching dangers such as getting too close to hills. The three main elements that pre-occupied this invention is the man-pilot (experience and state-of-mind), the machine (performance and capability), and the environment (day, night, traffic, clouds, hills or obstacles), while weather is just a small portion of it.

Considering the shortfalls that resulted into above described incidents, particularly with respect to preventing an aircraft from getting lost despite all the radars and satellites available out there, and to assist in detecting the flying environment, there is a need in the industry for a system that conclusively prevents the lost or disappearance, and crash of the manned aerial vehicle without a trace. In other words, there is a need for a system that ensures the family of those affected, despite such a tragedy, there is a chance that efforts will be made to quickly find their loved ones, regardless of the outcome.

SUMMARY OF THE INVENTION

The present invention relates to an on-board emergency remote assistance and data retrievable system which addresses the needs which were not fulfilled by the conventional arts. The on-board emergency remote assistance and data retrievable system of the present invention configured to download and retrieve image, audio and video information from the inside and outside of a manned aerial vehicle (MAV) using an on-board unmanned aerial vehicle (UAV) while the MAV is either in the air or crashed.

The present invention discloses a UAV system comprising at least one drone, in coordination with a remote station, to automatically locate a distressed MAV while in operation, to track it and provide assistance when possible, wherein the drone being integrated into the MAV.

One primary object of the present invention is to provide an on-board emergency remote assistance and data retrievable system for the MAV.

Another primary object of the invention is to be an instrument between the man, the machine, and the environment.

Another primary object of the present invention is to provide an on-board emergency remote assistance and data retrievable system for the MAV that support Artificial Intelligence (AI) and machine learning integrations.

Another primary object of the present invention is to provide an on-board emergency remote assistance and data retrievable system configured to access and retrieves flight data of the MAV.

Another primary object of the present invention is to provide an on-board emergency remote assistance and data retrievable system configured to access and retrieves a Cockpit Voice Recording (CVR) transcript of the MAV.

Another primary object of the present invention is to provide an on-board emergency remote assistance and data retrievable system configured to access and retrieve mechanical and electrical flight performance of the MAV.

Another primary object of the present invention is to provide an on-board emergency remote assistance and data retrievable system configured to access and retrieve audios, videos and images of the MAV, when available.

Another object of the present invention is to provide an on-board emergency response system that is mobile and independently operated.

Another object of the present invention is to provide an on-board emergency response system that provides remedies to the MAV in distress while in the air, when possible, including taking full control or command of the MAV using Artificial Intelligence (AI).

Another object of the present invention is to provide an on-board emergency response system configured to detect weapons, firearms, or any other prohibited objects on board MAV.

Still, another object of the present invention is to provide an on-board emergency response system that can be activated either by an onboard operator or from a remote location.

Also, another object of the present invention is to provide an on-board emergency response system that can transmit accurate location of the MAV which can be hard to locate through conventional means like radars.

Again, another object of the present invention is to provide an on-board emergency response system that can detect a possible danger onboard the MAV, then detach itself from said MAV to avoid being damaged, and send emergency information to a communication network when necessary.

Another object of the present invention is to provide an on-board emergency response system configured to reattach the UAV with the MAV if the emergency situation is resolved.

Furthermore, another object of the present invention is to provide an on-board emergency response system to pinpoint where the troubled MAV is located, and have the information sent remotely to the search and rescue center.

Also, another object of the present invention is to provide an on-board emergency response system that is part of a ground communication network and capable of sending and/or receiving information to and from the network.

Another object of the present invention is to provide an on-board emergency response system which can track the MAV from above while documenting the event using live videos and images.

Another object of the present invention is to provide an on-board emergency response system which renders a command center the means of communicating remotely with the MAV when the latter disappeared from a surveillance system like radar, while several attempts have been made to contact or re-establish contact with the MAV have failed.

Another object of the present invention is to provide an on-board emergency response system with means to help rescue a distressed MAV due to a pilot error. The UAV can then perform a quick diagnostic of the MAV while roving above it to determine the cause of the problem, depending of the situation. If pilot errors are detected and successfully corrected remotely, the remote command center can re-establish proper command of the MAV, either remotely or through the pilots, while preparing for an emergency landing and redirect the UAV to reattach itself with the MAV for an emergency landing. While the problem can be resolved remotely, the MAV must be landed at the closest airport so further diagnostics can be performed.

Another object of the present invention is to provide an on-board emergency response system which provides a vehicle operator one last chance, a second chance by using an onboard mean to re-establish communication with a command center while unable to do so in a conventional way because of current technical problems or other difficulties.

Another object of the present invention is to provide an on-board emergency response system which provides a means to document a tragedy that could not be avoided, due to the complexity of the situation, and sent remotely to the command center. Such evidence may include, but not limited to, entire flight's mechanical, voice data recordings, photos and video images from the inside as well as from the outside of the MAV, and photos and video images of where the MAV landed, crashed, or rested.

Another essential object of the present invention is to provide an on-board emergency response system which allows instant access to crucial plane's flight information, even before a crash, instead of searching the bottom of the ocean (sometimes in vain) after the fact. This industry could have been improved even further if we knew the main causes of all the planes' fatalities.

Another object of the present invention is to provide an on-board emergency response system that can automatically locate a crash site, if any, even in the middle of the night.

Again, another object of the present invention is to provide a means, in the event of a disaster, that allows the search and rescue team to get to the crash site sooner for possible life saving intervention, instead of searching for months or even years sometimes, with no result.

Further objects of the present invention will be brought out in the following part of the specification, wherein detailed description is for fully disclosing the invention without placing limitations thereon.

BRIEF DESCRIPTION OF THE DRAWINGS

The drawings constitute a part of this specification and include exemplary embodiment to the invention, which may be embodied in various forms. It is to be understood that in some instances various aspects of the invention may be shown exaggerated or enlarged to facilitate an understanding of the invention.

With the above and other related objects in view, the invention consists in the details of construction and combination of parts as will be more fully understood from the following description, when read in conjunction with the accompanying drawings in which:

FIG. 7A illustrates a 3-way communication between a MAV, a drone, and a command center, having remote access of a video images inside the MAV from the ground command center showing a hijacking in progress.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Before explaining the present invention in detail, it is to be understood that the invention is not limited in its application to the details of the construction and arrangement of parts illustrated in the accompanying drawings. The invention is capable of other embodiments, as depicted in different figures as described above and of being practiced or carried out in a variety of ways. It is to be understood that the phraseology and terminology employed herein is for the purpose of description and not of limitation.

It is to be also understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

It is to be understood that the term "MAV" hereinafter refers to a manned aerial vehicle which includes, but not limited to an airplane, an aero plane, an aircraft, a helicopter, a chopper, and a copter thereof.

It is to be understood that the term "UAV" hereinafter refers to an unmanned aerial vehicle which includes, but not limited to a drone thereof.

It is to be understood that the terms "a pilot", "an on-board operator", and "a vehicle operator", are interchangeable.

An on-board emergency system of the present invention applies to any type of vehicle comprising, but not limited to a manned aerial vehicle, a boat, a ship, a train, a tractor trailer, a bus or the like. The embodiments described below, however, are directed toward specific embodiments of the system to help locate and assist a distressed airplane. However, the methods and systems of the present invention apply equally to any other type of vehicle.

Figure 1:
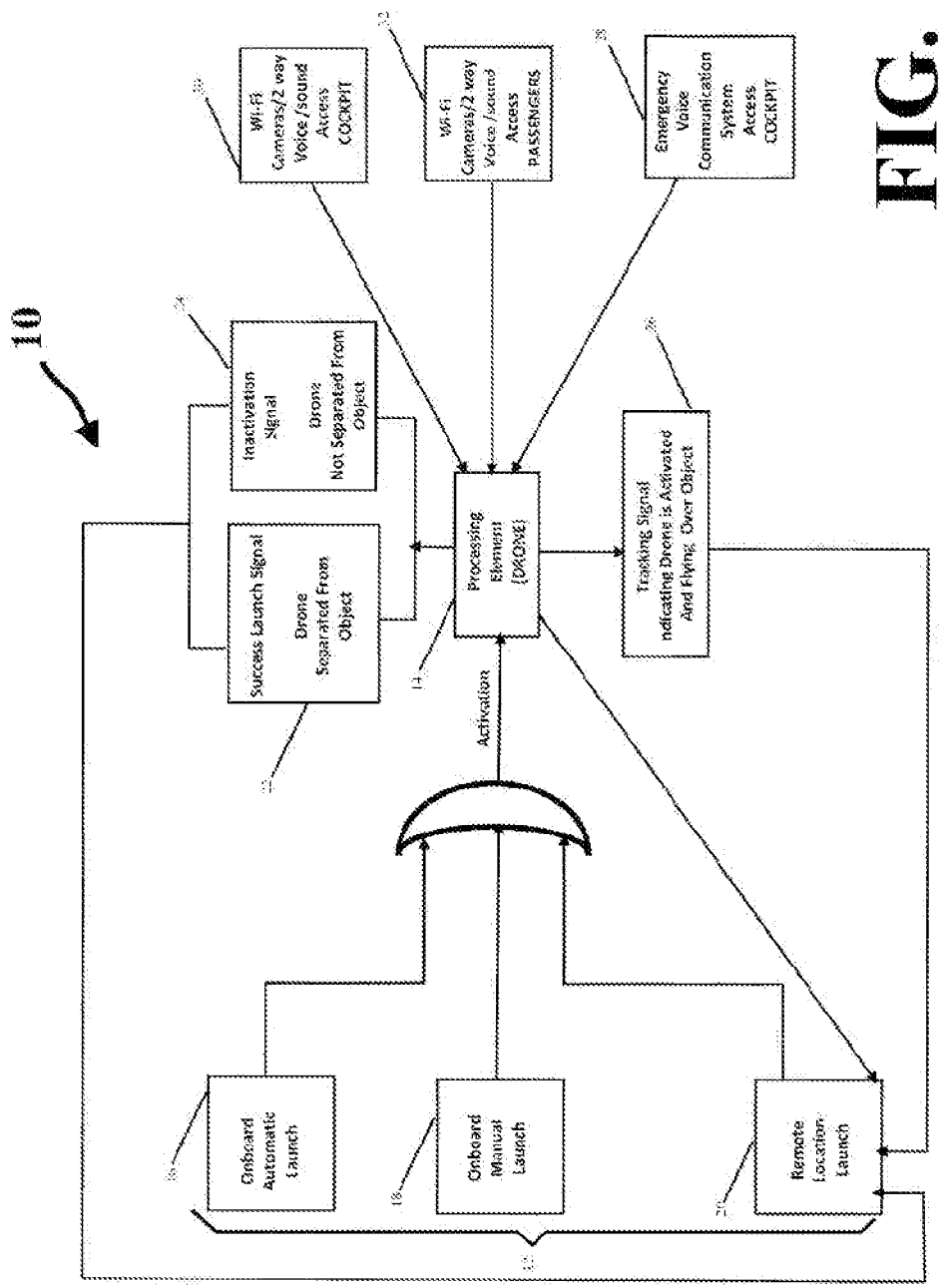
FIG. 1 illustrates a drone activation control system from a MAV according to an embodiment of the present invention.
Figure 2:
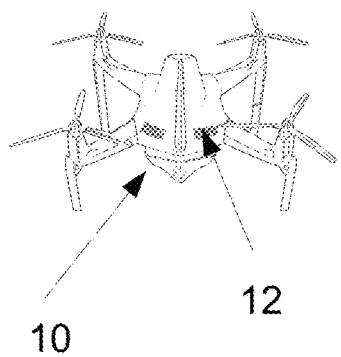
FIG. 2 illustrates a 3D view of a drone.
Figure 3:
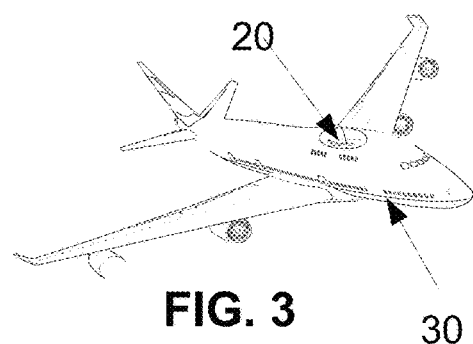
FIG. 3 illustrates a MAV with drone housing.
Figure 4:
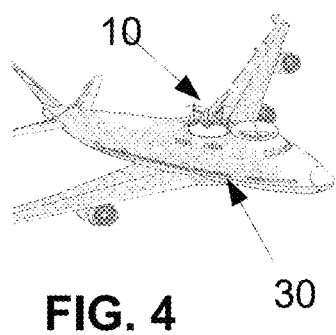
FIG. 4 illustrates a MAV with an open drone housing showing the drone itself.
Figure 6:
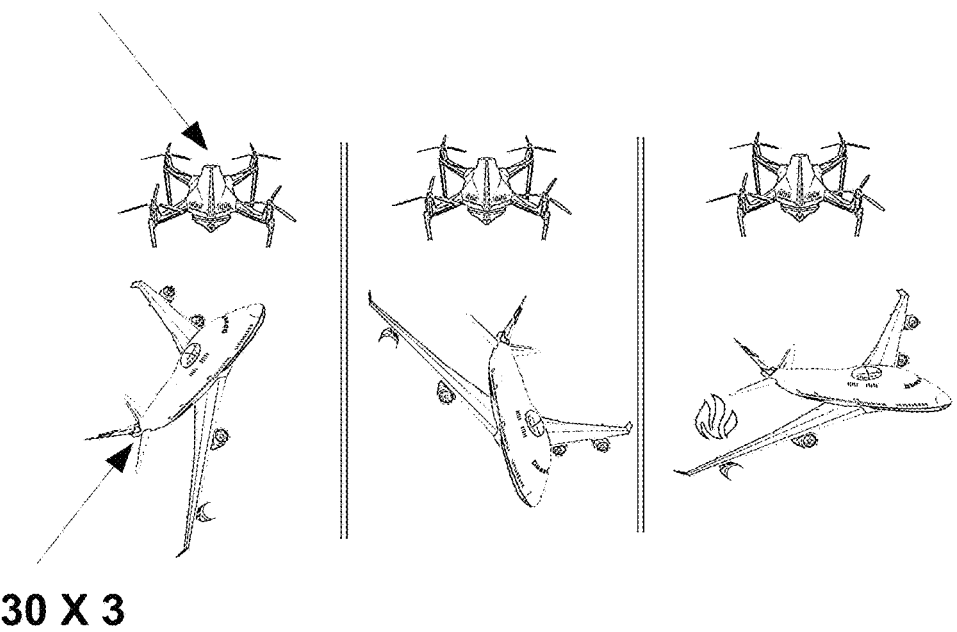
FIG. 6 illustrates multiple positions where a drone can be automatically ejected from the MAV.

The present invention will now be described by referencing the appended figures representing preferred embodiments. The embodiment of a system 10 for assisting and locate a distressed MAV includes at least one engagement element 12 and at least one processing element 14, as shown in the embodiments of FIG. 1. An engagement element 12 can be any type of element that initiates the launch of the location system of an UAV, such as a drone. For example, an engagement element 12 can transmit a signal to the processing element 14 directing engagement of launching the drone. As such, the engagement element can be, but is not limited to, a button, switch, lever, or the like, or any other device capable of transmitting a command to the processing element 14, such as a keyboard, a voice signal receiver, a touch screen, or a selection device such as a mouse in conjunction with a display. For instance, the location control system 10 can be activated automatically, as represented by box 16 of FIG. 1. In one embodiment, the engagement element 12 can be a sensor or the like that automatically transmits an engagement signal to the processing element 14 upon sensing a particular event. One such event can be the case where the MAV or aircraft is in an awkward or abnormal position during the flight as shown in FIG. 6. Such sensors can also be located anywhere in the MAV 40 where a type of threat to the security of the MAV or its passengers or other contents can be sensed. For instance, in an aircraft, an engagement sensor can be located proximate to the door of the cockpit, and the sensor can be programmed to transmit an engagement signal to the processing element when there is an attempt to cockpit door tampering or breach i.e. forcibly open the door, repeated poundings on the door, and or when an aircraft is in an upside-down position or vice versa. In the case of a cockpit door, the sensor(s) can have a minimum force threshold, such that force applied to the door must exceed the threshold before the automatic drone launch system can be automatically activated. Therefore, at least most inadvertent applications of force on the door by people or objects will not cause the system to automatically engage. In addition to or instead of the automatic engagement element(s) 16, the system 10 can include manual engagement element(s) 18, such as buttons, switches or the like, that authorized personnel, such as the pilots of an aircraft can actuate if a threat is detected. Thus, one or more manual and/or automatic engagement elements can be located onboard MAV 40, such as within and/or proximate the cockpit of an aircraft as represented by boxes 16 and 18 of FIG. 1.

Figure 5:
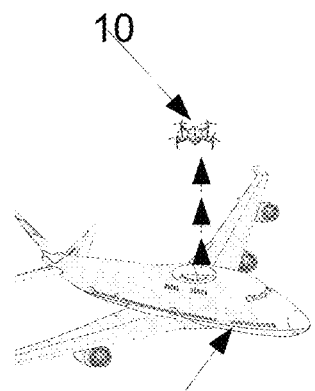
FIG. 5 illustrates a MAV showing a drone being ejected from the MAV.
Figure 7:
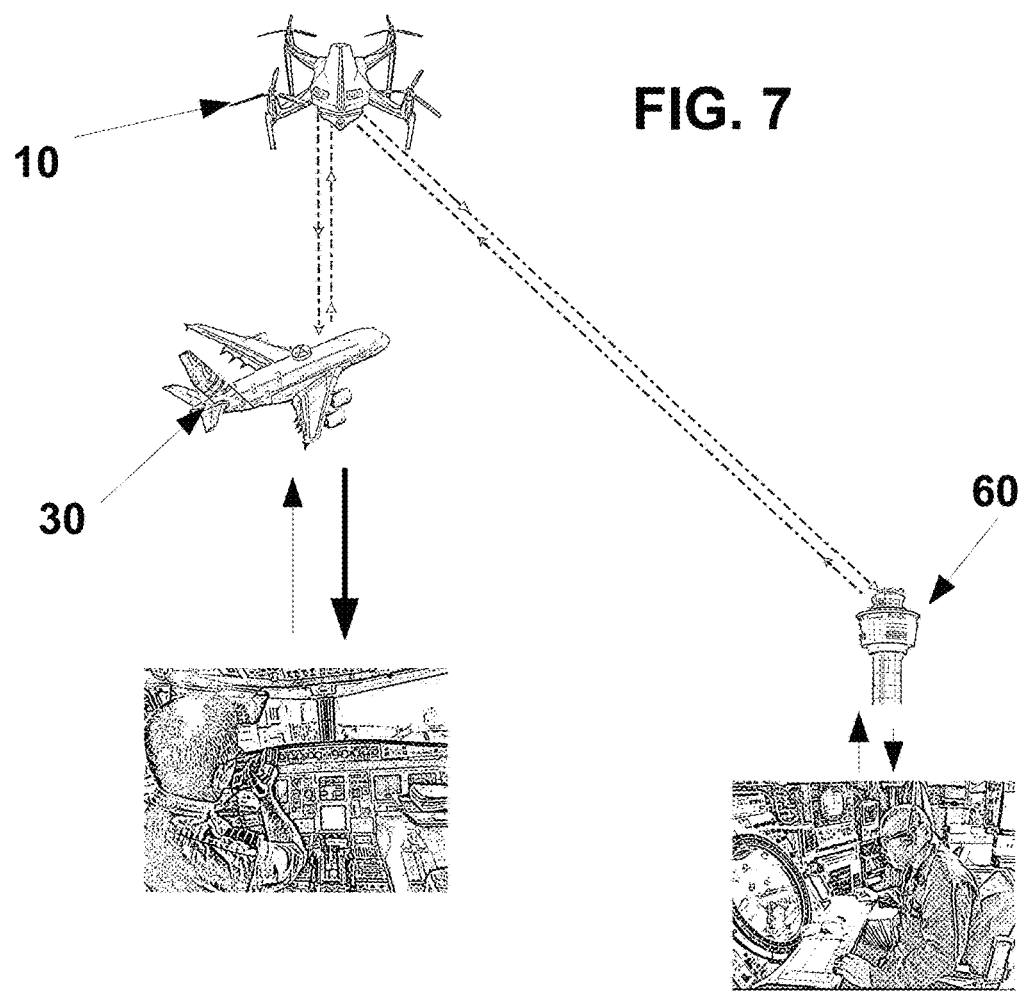
FIG. 7 illustrates a 3-way communication between a MAV, a drone, and a command center.

Furthermore, one or more locations outside MAV 40, i.e., one or more remote international locations from the Coast Guard, the Air Force, or the Navy, on a global scale, but in communication with MAV 40, as shown in FIG. 7, can include an engagement element, such that if a signal or other communication is received at the remote location that indicates a distress situation, or the security of MAV 40 can be in jeopardy, the engagement element can activate or launch drone 14, as shown in FIG. 5, from the remote location, as represented by box 20 of FIG. 1 so as to help in correcting any errors if possible, or in determining the gravity of the situation onboard MAV 40.

Figure 5A:
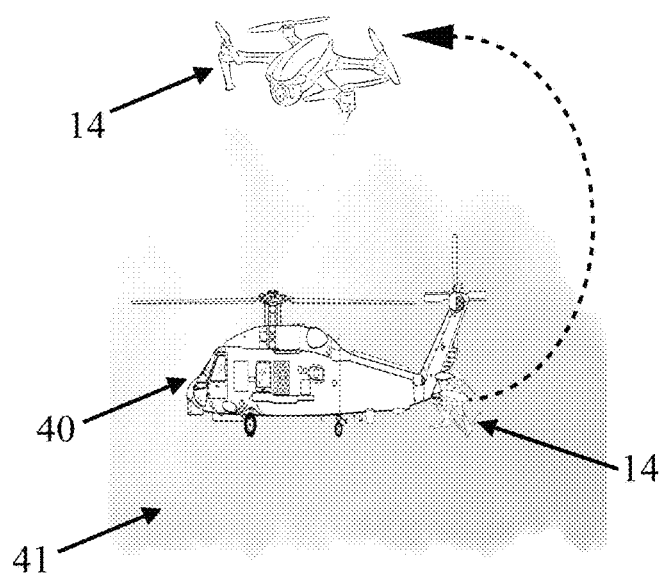
FIG. 5A illustrates a MAV with a drone being ejected from the lower back of the MAV, all the way to the top of MAV.

Referring further to FIG. 5A, where the pilot of MAV 40 having difficulty flying within clouds 41 is shown. Instead of climbing over clouds 41 which is riskier, the pilot ejects drone 14 from lower back of the MAV 40 all the way over the MAV 40 and the clouds 41 while being assisted by said drone 14 throughout the route. The pilot ejects the drone 14 by actuating manual engagement element 18.

Figure 8:
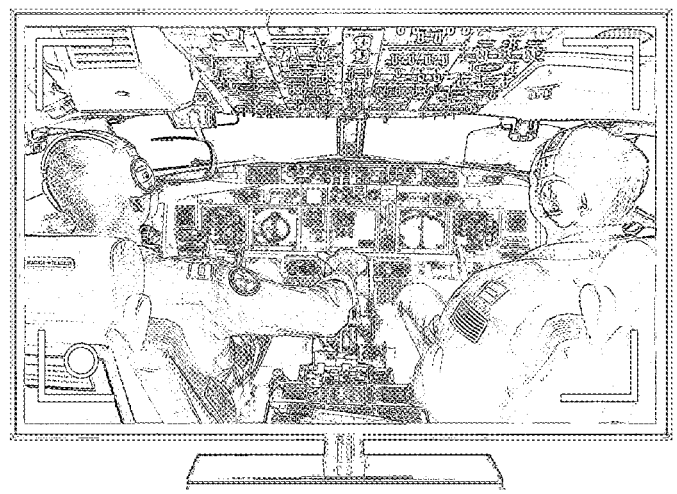
FIG. 8 illustrates a view of a cockpit of a MAV.
Figure 9:
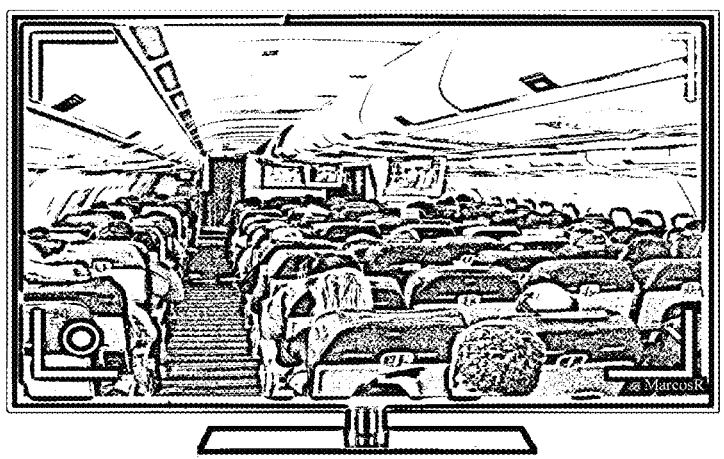
FIG. 9 illustrates a view of a passenger's area of a MAV.

A personnel and/or an equipment at the remote location can monitor the aircraft and can be capable of detecting certain events using onboard Wi-Fi security cameras as represented by box 28, 30, and 32 of FIG. 1, and also depicted in FIGS. 8, and 9. If the processing element (drone) 14 is activated because of the MAV malfunctions such as engine failure, fire, smoke, and a catastrophe is therefore imminent, then the drone 14 should be automatically ejected from the MAV and be able to track the MAV 40 all the way to the end, using a predetermined distance above the MAV 40 as shown in FIG. 5. Also, drone 14 automatically launches in the event the MAV 40 becomes undetectable on a tracking or radar at the air traffic control center during flight.

Figure 7B:
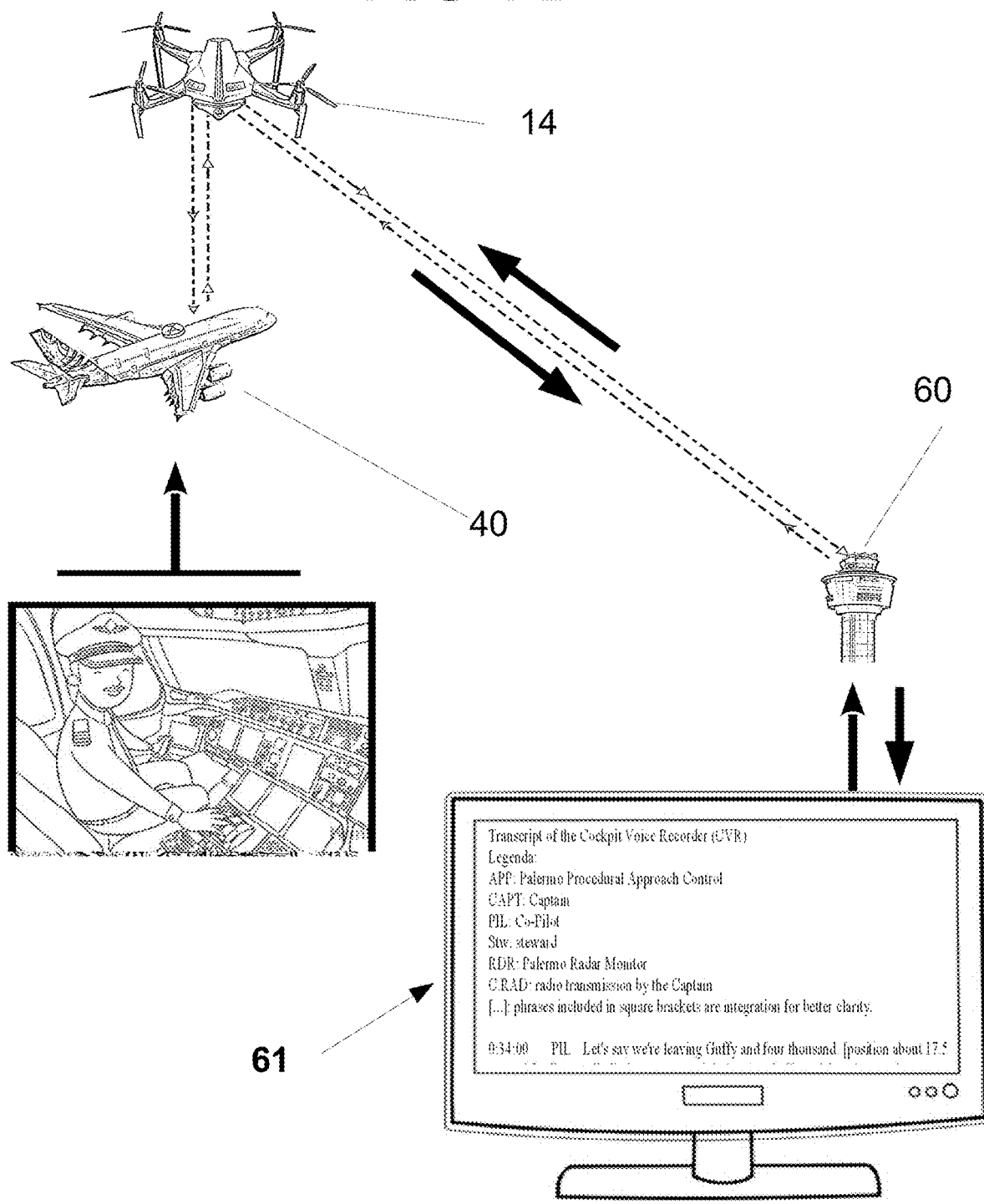
FIG. 7B illustrates a 3-way communication between a MAV, a drone, and a command center, having remote access of the Cockpit Voice Recording (CVR) transcript.

Referring to FIGS. 7A & 7B, which shows 3-way communication between the MAV 40, the drone 14, and a remote command center 60. During hijacking 63 or any other similar scenario, a weapon or a firearm can be involved. The drone 14 detects such weapons and can be automatically self-launched in the event, when any of such weapons is fired onboard MAV 40. Also, after launching, the drone 14 can access and retrieve the flight data of the MAV 40 inside-out. The flight data includes audios, videos, images, etc. of the MAV 40 inside-out. The drone 14 then communicates the detected and retrieved flight data with the command center 60 on the ground, and the command center 60 sends respective command to the drone 14 based on the situation. In this way, the command center 60 has remote access of the audios, videos and the images inside-out the MAV 40 by being on the ground. Moreover, with the help of Artificial Intelligence (AI), the drone 14 can also be able to detect if the weapon has been carried undetected onboard MAV 40, even before the flight took off.

Furthermore, while the drone 40 is in the air, the personnel at the remote location can also access any data related to the flight, including mechanical and electrical flight performance, and cockpit voice recording transcript as shown in FIG. 7B. Currently, such information is available through a BLACK BOX only whenever such device is available. This information however can be permanently lost if the BLACK BOX can never be found. After the drone 40 is launched from MAV 40, the videos and the images showing a glimpse of the condition of MAV 40 from the inside-out, including the cockpit, can be sent through the drone 14 to the special unit team on the ground as shown in FIGS. 8 and 9. The drone 14 is automatically or manually ejected, then roved over the flying or distressed MAV 40, while at the same time preserving the important flight data if a crash does occur. The flight data can be accessed and retrieved remotely from the remote command center 60; the moment said event is unfolding, and the drone 14 still roving above and tracking distressed MAV 40, getting a head up of what caused the break down with no waiting.

Figure 10:
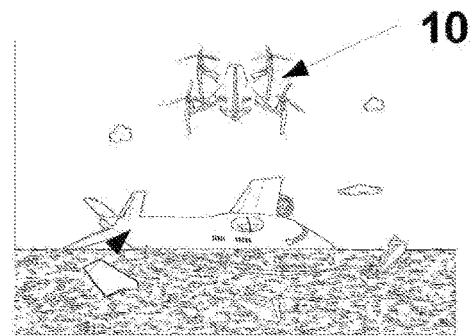
FIG. 10 illustrates a drone roving over a MAV crashed on water.
Figure 11:
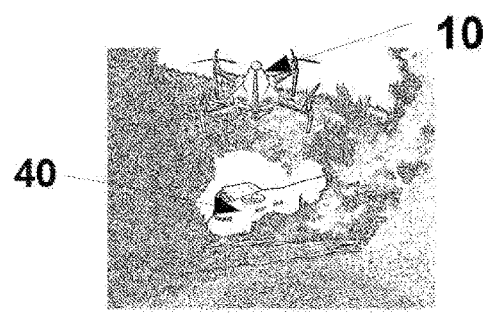
FIG. 11 illustrates a drone roving over a MAV crashed on land.

Since the drone 14 is designed to follow MAV 40 wherever it goes once launched, it might end up floating wherever MAV 40 can be landing, above water or land. If above the water, drone 14 is also equipped with water sensor that would prevent it from chasing MAV 40 deep under the ocean. Instead, it will keep tracking MAV 40 from above at a predetermined distance from the water, as shown in FIG. 10, as the current continues to drag the MAV 40 deeper. If depth limit of sensor is reached and the search team is still not at the scene, drone 40 would stay still, where the depth limit was reached. If crash site is on land, drone 14 is equipped with heat and smoke sensors to keep itself far above the crash site as depicted in FIG. 11.

Figure 12:
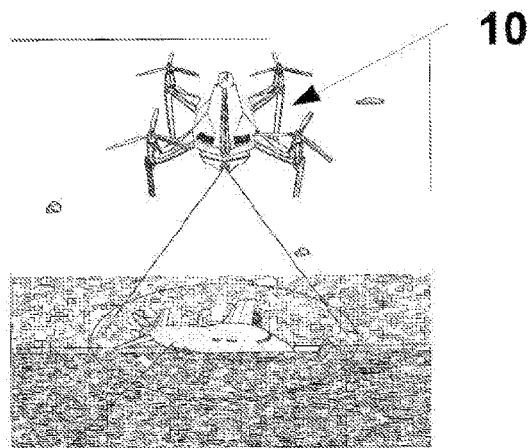
FIG. 12 illustrates a drone providing lightning over a water crash site at nighttime.
Figure 13:
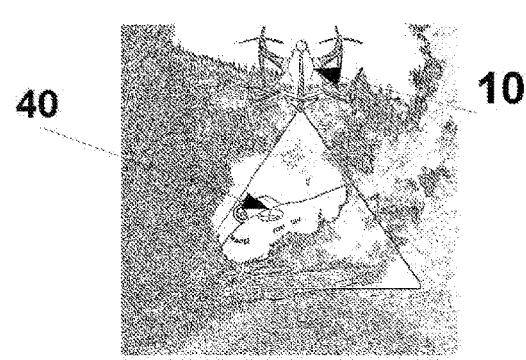
FIG. 13 illustrates a drone providing lightning over a land crash site at nighttime.

Also, drone 14 has the capability to provide light to the crash sites from above, either on water or on land, using its onboard powerful flashlight, as shown in FIGS. 12 and 13.

Figure 14:
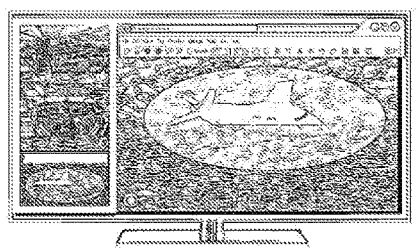
FIG. 14 illustrates a view showing images sent from the drone to the control command center with radar indicating the exact location of the crash.

The Wi-Fi cameras of drone 14, as depicted in box 30 of FIG. 1, with night vision capability when needed, can transmit live video images to remote location 20 any time of the day, giving a glimpse of the state of MAV 40 just moment after the crash, as shown in FIG. 14.

Figure 15:
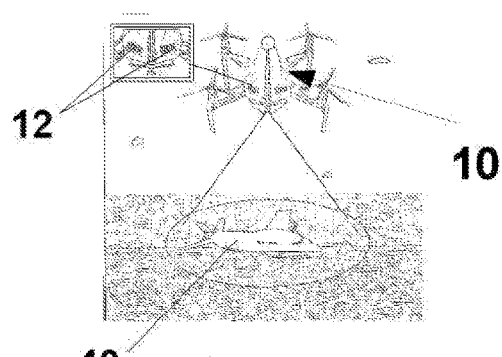
FIG. 15 illustrates a view of the drone's solar power capability.

Beside long-lasting batteries, drone 14 is also equipped with mini solar cell 12, power backup in the event more time is needed for the rescue team to arrive, providing that sunlight is available as shown in FIG. 15. In the event when battery of drone 14 reaches its lowest preset level, it would automatically be switched to a backup solar power 12. The idea is to maintain sufficient power on board for communication purpose.

Figure 16:
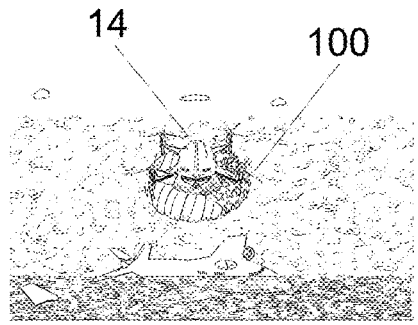
FIG. 16 illustrates a view of the drone landing on water because of lack of power.
Figure 18:
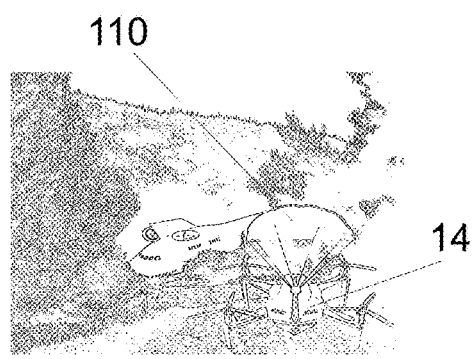
FIG. 18 illustrates a view where the water's search and rescue team arrive at the scene.

In the event when solar power 12 is unavailable, and the crash is on land, then onboard emergency parachute 110 of drone 14 would automatically be deployed. Drone 14 will then be programmed to land itself away from the crash site, as shown in FIG. 18. However, if the crash site is on water, built-in inflatable raft 100 of drone 14 would also automatically be deployed, so drone 14 might float over the water surface without the risk of being submerged, as illustrated in FIG. 16.

Figure 17:
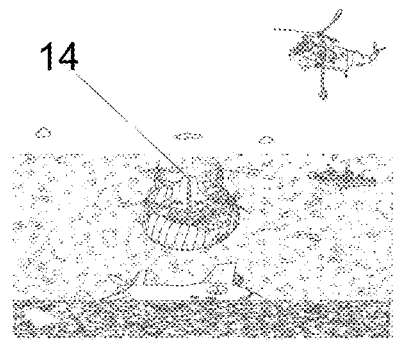
FIG. 17 illustrates a view of the drone landing on land because of lack of power.
Figure 19:
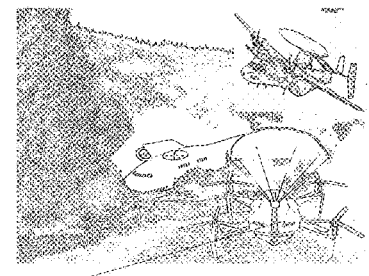
FIG. 19 illustrates a view where a reconnaissance airplane from the land's search rescue team arrives at the scene.
Figure 20:
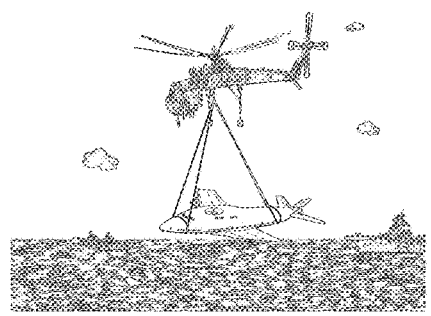
FIG. 20 shows a crashed MAV being retrieved from the water by a heavy lifting helicopter.

Now since the crash site can be easily located, contrary to the conventional system, first response team can be at the scene quicker for a preliminary assessment, as shown in FIGS. 17 and 19. On the other hand, the search and rescue team have a better chance in saving some lives by being on the crash site sooner, as depicted in FIG. 20.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

The invention claimed is:

1. An on-board emergency remote assistance and data retrievable system for a manned aerial vehicle (MAV), comprising:
   an unmanned aerial vehicle (UAV) having a physical connection and a wireless connection with the MAV, and also having a wireless communication connection to a remote command center, wherein the UAV is configured to download and retrieve flight data of the MAV while the MAV is either in air or crashed, and all other tasks assigned and/or provided to or by a flight data recorder, a manual and an automatic launch trigger connected to a plurality of sensors enabled to detect an emergency situation in the MAV, wherein upon detection of the emergency situation by one of a plurality of occupants of the MAV, the manual launch trigger is configured to be initiated manually by the occupant; and upon detection of the emergency situation by at least one of the sensors, the automatic launch trigger is configured to be initiated automatically, characterized in that, a three-way communication initiates between the MAV, the UAV, and the remote command center once the UAV is launched, wherein the UAV communicates the downloaded and retrieved flight data with the remote command center on ground, and the remote command center sends respective command to the UAV based on the emergency situation, wherein the UAV is automatically launched in the event when the MAV becomes undetectable on a tracking or radar at an air traffic control center during flight.

2. The on-board emergency remote assistance and data retrievable system as claimed in claim 1, wherein the flight data comprising a plurality of audios, videos, and images of the MAV.

3. The on-board emergency remote assistance and data retrievable system as claimed in claim 1, wherein the flight data comprising a cockpit voice recording transcript.

4. The on-board emergency remote assistance and data retrievable system as claimed in claim 1, wherein the flight data comprising a mechanical and electrical flight performance.

5. The on-board emergency remote assistance and data retrievable system as claimed in claim 1, wherein the UAV is automatically launched from the MAV if a smoke is detected within or on the MAV.

6. The on-board emergency remote assistance and data retrievable system as claimed in claim 1, wherein the emergency situation, is remotely diagnosed and fixed, when possible, by the remote command center.

7. The on-board emergency remote assistance and data retrievable system as claimed in claim 1, wherein the UAV is configured to reattach itself with the MAV if the emergency situation is resolved.

8. The on-board emergency remote assistance and data retrievable system as claimed in claim 1, wherein the UAV is automatically or manually ejected, then roved over the flying or distressed MAV while providing a current location of the MAV and at the same time preserving the flight data if a crash does occur.

\* \* \* \* \*